Patented Oct. 15, 1940

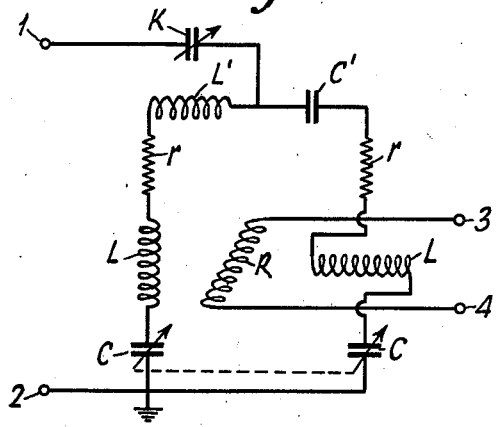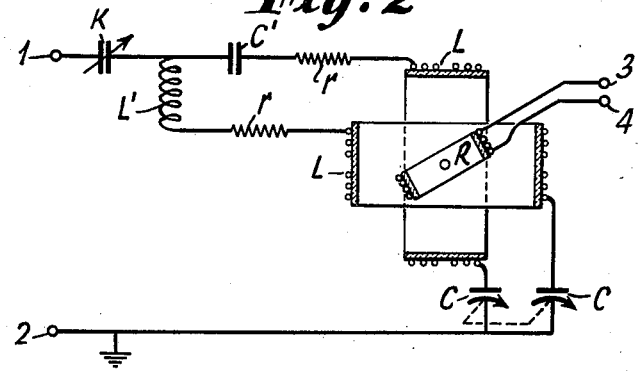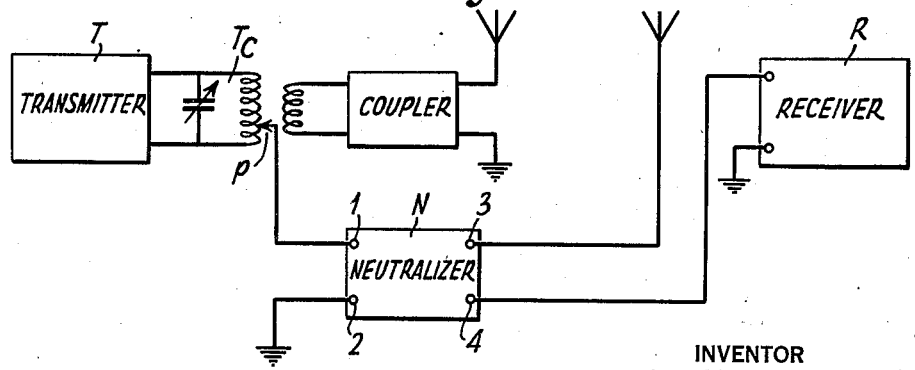

2,218,098

UNITED STATES PATENT OFFICE 2,218,098

INTERFERENCE ELIMINATION

Walter van B. Roberts, Princeton, N. J., assignor to Radio Corporation of America, a corporation of Delaware Application July 30, 1938, Serial No. 222,097

3 Claims. (Cl. 250—20)

My present invention is concerned with a method of and means for eliminating interfering voltage in a receiver produced by a nearby transmitter, and involves the utilization of a portion of the transmitter power to produce a rotating field, picking up the proper phase of voltage from said field and injecting said voltage into the receiver antenna, and controlling the magnitude of the voltage to equal that which is to be neutralized.

An object of this invention in its broadest aspect is therefore to provide a means for splitting a high frequency current into two components having substantially fixed phase and magnitude relations over a relatively wide band of frequencies.

A particular object is to split the phase of any current within a range of frequencies into two components ninety degrees apart in phase and equal in magnitude. In many cases it is desirable to split the phase of a high frequency current and means for doing this are known in the art. However, when the frequency of the current is changed the amount of phase split varies, and extensive and difficult adjustments of the phase splitting circuits are required to restore the phase difference and current magnitudes to the desired values. According to the invention the phase shift and current magnitudes remain constant as the phase splitting network is tuned over a range of frequencies by a simple variation of capacity.

Other objects and advantages of the invention will best be understood by reference to the following description taken in connection with the accompanying drawing in which Fig. 1 shows the phase splitting network of the present invention. Fig. 2 shows a constructional arrangement of the network shown in Fig. 1 and Fig. 3 shows the phase splitting network utilized to provide the correct phase of voltage for neutralizing an undesired voltage in a receiver circuit that is picked up from a nearby transmitter.

Referring to Figs. 1 and 2 the phase splitting network is shown to comprise a pair of input terminals 1 and 2 between which are connected in series a variable condenser K and a closed circuit consisting of a pair of parallel branches, one of which includes the fixed condenser C', the resistance $r$, inductance L and variable condenser C and the other of which includes the coil L' in addition to the elements $r$, L and C which are equal in magnitude to the respective elements of the first branch. The coils L, L of the respective branches are disposed on forms arranged at right angles to one another as shown more clearly in Fig. 2 whereby fields at right angles to each other are produced, resulting in a rotating magnetic field as well known in the art provided the currents in the coils L, L are equal in magnitude but 90° different in phase. A small pick-up coil R is mounted on the common axis of the two coils L, L and by manipulating the angular position of the coil R the proper phase of voltage is picked up by the coil from the rotating field produced. This voltage of proper phase appears across the output terminals 3, 4 of the network and is utilized in the manner hereinafter to be explained.

Analysis of the circuit of Fig. 1 shows that the currents in the two branches will be equal in magnitude and ninety degrees different in phase if inductance L' and capacity C' are so chosen that $$wL' + \frac{1}{wC'} = 2r$$

and the tuning condensers C are adjusted as explained later, $w$ being the angular frequency of the current to be split.

If furthermore L' and C' are chosen to make $$wL' = r \text{ and } \frac{1}{wC'} = r$$

then the relation previously given holds approximately true for a considerable departure from the assumed value of $w$ in either direction, and hence the desired phase splitting action is approximately obtained over a frequency range of nearly two to one without any alteration of the values of L' or C'. Furthermore it may be arranged to be obtained exactly at any two frequencies so that for example in amateur apparatus it may be arranged to be exactly correct in any two of the amateur bands. In the above expressions it is assumed that $r$ represents the entire resistance of each branch circuit and that $r$ is independent of frequency. This assumption may be justified by making $r$ a fixed resistance large in comparison with the resistance of coil L, or by winding coil L of very fine wire whose resistance does not vary appreciably with frequency.

As an example of the method of design let us suppose that the phase splitter is desired to operate at either 7 megacycles or 14 megacycles. We must then satisfy the equations $$2\pi 7 \times 10^6 L' + \frac{1}{2\pi 7 \quad 10^6 C'} = 2r$$

$$2\pi 14 \times 10^6 L' + \frac{1}{2\pi 14 \quad 10^6 C'} = 2r$$

Solution of these equations gives the required values of L' and C' for any assumed value of $r$. The choice of value of $r$ is limited only by the considerations that too small a value will make the adjustment of C too critical, while too large a value will too greatly reduce the magnitude of the currents flowing. With the constants determined in the preceding fashion, the phase splitter will operate to give an exact ninety-degree phase split at the two frequencies 7 and 14 mc. and will give substantially ninety degrees phase shift at all intervening frequencies as well as a little way outside of each of these limits. The criterion of adjustment of the identical condensers C, which are preferably uncontrolled, is that the closed circuit consisting of the two branches considered as being connected in series with each other, is tuned to resonance with the operating frequency.

Referring now to Fig. 3, there is schematically shown a transmitter T and a nearby receiver R whose antennae are sufficiently close so that transmitter voltage picked up in the receiving antenna prevents reception of signals. The block N marked "neutralizer" contains the phase splitting circuit of Figs. 1 and 2 with its input terminals 1, 2 connected to the left hand terminals 1, 2 of the block diagram. Current of the transmitted frequency is tapped from any convenient portion of the transmitter, such as the tank circuit Tc, and passed through the phase splitter which is adjusted to produce equal currents ninety degrees different in phase through the two coils L. As stated above, these coils are arranged to produce a rotating magnetic field by arranging the coils to produce equal fields at right angles with each other at a given point in space. At this point in space a rotatable pick-up coil R is located having its terminals 3, 4 connected to the right hand terminals 3, 4 of the neutralizer. By adjusting this pickup coil a voltage of any desired phase is injected into the antenna circuit of the receiver. The magnitude of this voltage may be adjusted by changing the tapping point P on the tank circuit of the transmitter to which the neutralizer is connected, or by varying blocking condenser K, or by any other suitable means.

When the phase and magnitude of the neutralizing voltage are both correctly adjusted there will be substantially no interference with reception caused by the operation of the transmitter. In other words the neutralizer will inject into the receiving antenna a voltage equal and opposite to what is picked up from the transmitter thus allowing transmission while the receiver is receptive to "break in" by the station being communicated with, even though the stations be transmitting on nearly the same frequencies.

While I have shown and described only one form of my invention and the method of carrying the same out, it will be apparent that modifications and changes may be made without departing from the spirit and scope of my invention. For example, if correct phase splitting is required at only one frequency, one of the reactances $wL'$ and $$\frac{1}{wC'}$$

may be chosen arbitrarily equal to zero, thus dispensing with one element.

What I claim is:

1. The method of eliminating interfering voltage in a receiver produced by a nearby transmitter which consists in utilizing a portion of the transmitter energy to produce a rotating electromagnetic field, controlling the strength of said field, picking up a voltage of any desired phase from said field, and applying said voltage in the receiver antenna circuit to neutralize the undesired voltage.

2. The method of eliminating interfering voltage in a receiver produced by a nearby transmitter which consists in utilizing a portion of the transmitter energy to produce a rotating electromagnetic field, picking up a voltage of any desired phase from said field, adjusting the magnitude of said voltage, and applying said voltage in the receiver antenna circuit to neutralize the undesired voltage.

3. In a communication system wherein the receiver is affected by an interfering voltage produced by a nearby transmitter, a circuit for neutralizing an interfering voltage comprising a pair of input terminals across which the transmitter energy is impressed, an adjustable condenser having one side connected to one of the input terminals, a closed circuit connected between the other side of said adjustable condenser and the other input terminal which is grounded, said closed circuit consisting of a pair of parallel paths, each including resistance, equal inductances and equal capacities, one of said paths including an additional reactance element, said equal inductances being so constructed and arranged to produce a rotating electromagnetic field, an adjustable pick-up coil cooperating with said field producing inductances for deriving a voltage of proper phase, and means for applying said derived compensating voltage to the receiver input.

WALTER VAN B. ROBERTS.